United States Patent
Talkad Srinivasan et al.

(10) Patent No.: US 11,782,796 B2
(45) Date of Patent: Oct. 10, 2023

(54) METHOD AND SYSTEM FOR VIRTUAL MACHINE PROTECTION

(71) Applicant: EMC IP Holding Company LLC, Hopkinton, MA (US)

(72) Inventors: Sharath Talkad Srinivasan, Bengaluru (IN); Rakesh Kumar, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 230 days.

(21) Appl. No.: 16/987,461

(22) Filed: Aug. 7, 2020

(65) Prior Publication Data

US 2022/0043716 A1 Feb. 10, 2022

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 2009/45562* (2013.01); *G06F 2009/45583* (2013.01); *G06F 2009/45595* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 9,720,783 B1* | 8/2017 | Kulkarni | G06F 11/1461 |
| 9,886,354 B1* | 2/2018 | Mallik | G06F 11/1469 |
| 9,977,704 B1* | 5/2018 | Chopra | G06F 11/0793 |
| 2013/0227699 A1* | 8/2013 | Barak | H04L 63/0823 718/1 |
| 2014/0095816 A1* | 4/2014 | Hsu | G06F 11/1451 711/162 |
| 2015/0249615 A1* | 9/2015 | Chen | G06F 9/45558 709/226 |
| 2016/0070666 A1 | 3/2016 | Roberston et al. | |
| 2016/0162315 A1* | 6/2016 | Pannem | G06F 9/45558 718/1 |
| 2019/0266056 A1* | 8/2019 | Wu | G06F 9/3891 |

OTHER PUBLICATIONS

Felber, "Time-Based Software Transactional Memory", IEEE Computer Society (Year: 2010).*

* cited by examiner

*Primary Examiner* — Wynuel S Aquino
(74) *Attorney, Agent, or Firm* — Chamberlain, Hrdlicka, White, Williams, & Aughtry

(57) ABSTRACT

A method and system for virtual machine protection. Specifically, the disclosed method and system dynamically protect virtual machine state from impactful events, such as accidental virtual machine deletions and shutdowns. The disclosed method and system work to stall the fulfillment of these impactful events while instigating the backup of protected virtual machine state, and thereafter, only permit these impactful events to proceed upon completion of the backup operation.

12 Claims, 6 Drawing Sheets

METHOD AND SYSTEM FOR VIRTUAL MACHINE PROTECTION

BACKGROUND

While deployed in a production environment, virtual machines are susceptible to events, such as accidental deletions, which may lead to the unexpected loss of virtual machine state.

SUMMARY

In general, in one aspect, the invention relates to a method for virtual machine protection. The method includes detecting a triggered protection event for a virtual machine residing on a virtual machine host, in response to detecting the triggered protection event, initiating creation of a virtual machine snapshot for the virtual machine, issuing, to the virtual machine host, a backup message directed to performing a backup operation targeting the virtual machine, and aborting, upon completion of the backup operation, the creation of the virtual machine snapshot.

In general, in one aspect, the invention relates to a non-transitory computer readable medium (CRM). The non-transitory CRM includes computer readable program code, which when executed by a computer processor, enables the computer processor to detect a triggered protection event for a virtual machine residing on a virtual machine host, in response to detecting the triggered protection event, initiate creation of a virtual machine snapshot for the virtual machine, issue, to the virtual machine host, a backup message directed to performing a backup operation targeting the virtual machine, and abort, upon completion of the backup operation, the creation of the virtual machine snapshot.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for virtual machine protection. Specifically, one or more embodiments of the invention dynamically protects virtual machine state from impactful events, such as accidental virtual machine deletions and shutdowns. The disclosed method and system work to stall the fulfillment of these impactful events while instigating the backup of protected virtual machine state, and thereafter, only permit these impactful events to proceed upon completion of the backup operation.

Figure 1A:
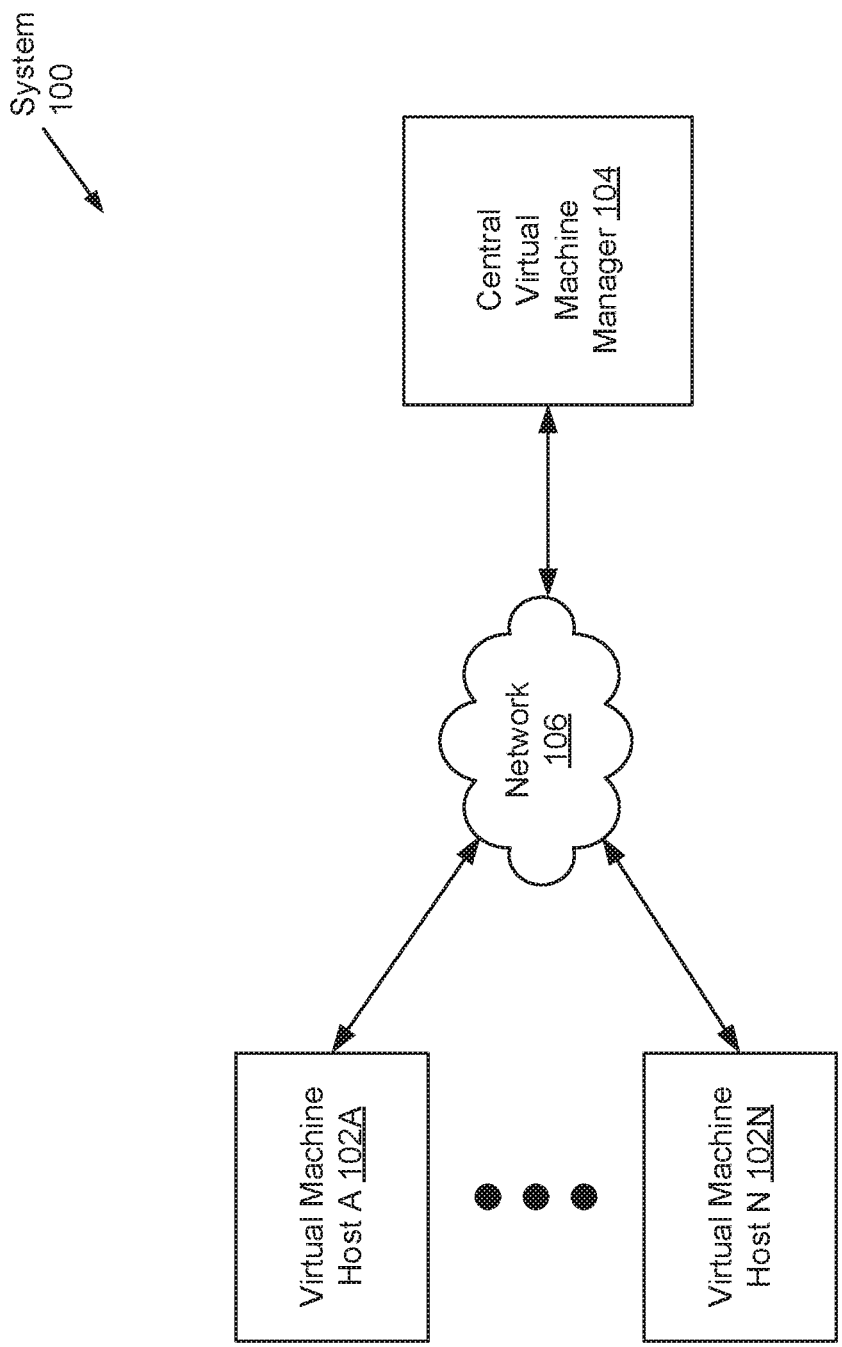
FIG. 1A shows a system in accordance with one or more embodiments of the invention.

FIG. 1A shows a system in accordance with one or more embodiments of the invention. The system (100) may include one or more virtual machine hosts (102A-102N) operatively connected to a central virtual machine manager (104) through a network (106). Each of these system (100) components is described below.

In one embodiment of the invention, a virtual machine host (102A-102N) may represent any physical appliance or computing system configured to receive, generate, process, store, and/or transmit digital data, as well as to provide an environment in which one or more computer programs may execute thereon. The aforementioned computer programs may, for example, implement large-scale and complex data processing; or implement one or more services offered locally or over the network (106). Further, in providing an execution environment for any computer programs installed thereon, a virtual machine host (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a virtual machine host (102A-102N) may perform other functionalities without departing from the scope of the invention. Examples of a virtual machine host (102A-102N) may include, but are not limited to, a desktop computer, a laptop computer, a server, a mainframe, or any other computing system similar to the exemplary computing system shown in FIG. 4. Moreover, virtual machine hosts (102A-102N) are described in further detail below with respect to FIG. 1B.

In one embodiment of the invention, the central virtual machine manager (104) may represent a centralized management platform for virtual machines (not shown) executing on the one or more virtual machine hosts (102A-102N). The central virtual machine manager (104) may further represent a virtual machine state backup, archiving, and/or disaster recovery service. The central virtual machine manager (104) may be implemented using one or more servers (not shown). Each server may represent a physical or virtual server, which may reside in a datacenter or a cloud computing environment. Additionally or alternatively, the central virtual machine manager (104) may be implemented using one or more computing systems similar to the exemplary computing system shown in FIG. 4. The central virtual machine manager (104) is described in further detail below with respect to FIG. 1C.

In one embodiment of the invention, the above-mentioned system (100) components may operatively connect to one another through the network (106) (e.g., a local area network (LAN), a wide area network (WAN) such as the Internet, a mobile network, any other network type, or a combination thereof). The network (106) may be implemented using any combination of wired and/or wireless connections. Further, the network (106) may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

While FIG. 1A shows a configuration of components, other system (100) components may be used without departing from the scope of the invention. For example, in one embodiment of the invention, the system (100) may further include a backup storage system (not shown) operatively connected to the virtual machine host(s) (102A-102N) and the central virtual machine manager (104). In such an embodiment, the backup storage system may substitute or supplement at least the portion of the central virtual machine manager (104) that implements the virtual machine state backup, archiving, and/or disaster recovery service. The backup storage system may be implemented using one or more servers (not shown). Each server may represent a physical or virtual server, which may reside in a datacenter or a cloud computing environment. Additionally or alternatively, the backup storage system may be implemented using one or more computing systems similar to the exemplary computing system shown in FIG. 4.

Figure 1B:
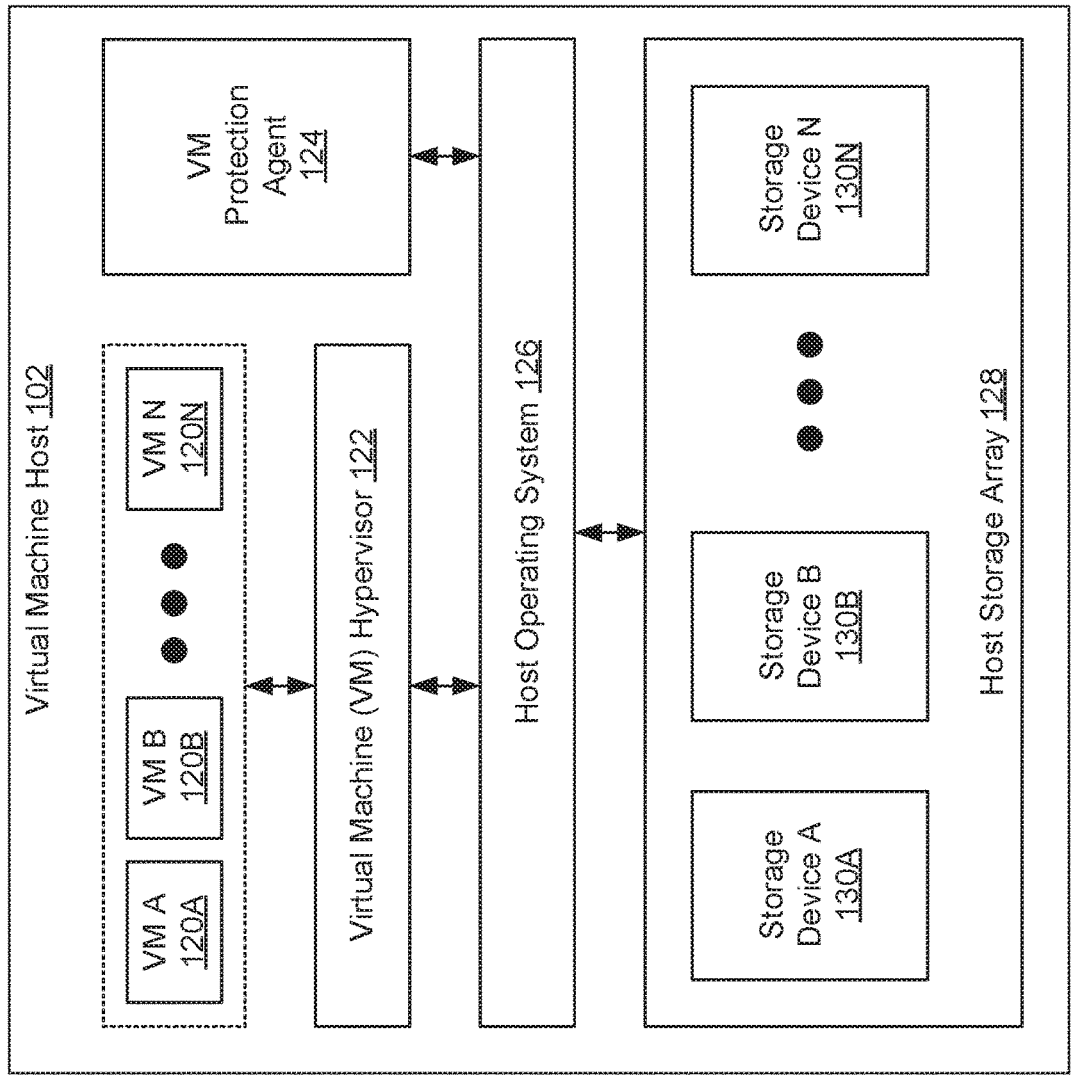
FIG. 1B shows a virtual machine host in accordance with one or more embodiments of the invention.

FIG. 1B shows a virtual machine host in accordance with one or more embodiments of the invention. The virtual machine host (102) may include one or more virtual machines (120A-120N), a virtual machine hypervisor (122), a virtual machine protection agent (124), a host operating system (126), and a host storage array (128). Each of these virtual machine host (102) subcomponents is described below.

In one embodiment of the invention, a virtual machine (120A-120N) may represent a computer program that executes on the underlying hardware of the virtual machine host (102). Further, a virtual machine (120A-120N) may represent a computer program that emulates a physical computing system and, thus, provides a self-contained execution environment on which one or more other computer programs (e.g., guest operating systems (OS s) and/or applications) may execute. In addition, a virtual machine (120A-120N) may access the underlying virtual machine host (102) hardware and interact with other virtual machine host (102) subcomponents using an abstraction layer—i.e., the virtual machine hypervisor (122) (described below). One of ordinary skill will appreciate that a virtual machine (120A-120N) may perform other functionalities without departing from the scope of the invention.

In one embodiment of the invention, the virtual machine hypervisor (122) may represent a computer program that executes on the underlying hardware of the virtual machine host (102). Specifically, the virtual machine hypervisor (122) may be a computer program tasked with the management of one or more virtual machines (120A-120N). To that extent, the virtual machine hypervisor (122) may include functionality to: create and delete virtual machines (120A-120N); allocate or deallocate virtual machine host (102) resources to support the operation of the virtual machines (120A-120N); and enable, as well as manage, intra-host communication between the virtual machines (120A-120N) and other virtual machine host (102) subcomponents, such as the host storage array (128). One of ordinary skill will appreciate that the virtual machine hypervisor (122) may perform other functionalities without departing from the scope of the invention.

In one embodiment of the invention, the virtual machine protection agent (124) may represent a computer program that executes on the underlying hardware of the virtual machine host (102). Specifically, the virtual machine protection agent (124) may be responsible for managing aspects pertaining to virtual machine state protection, including, but not limited to, coordinating and, in part, implementing virtual machine state backup operations, virtual machine state replication or cloning operations, and/or virtual machine state recovery operations. The virtual machine protection agent (124) may include functionality to interact or communicate with a counterpart agent on the central virtual machine manager (see e.g., FIGS. 1A and 1C) in order to ensure virtual machine state protection. One of ordinary skill will appreciate that the virtual machine protection agent (124) may perform other functionalities without departing from the scope of the invention.

In one embodiment of the invention, the host operating system (126) may refer to a computer program that executes on the underlying hardware of the virtual machine host (102). Specifically, the host operating system (126) may be configured to oversee virtual machine host (102) operations. To that extent, the host operating system (126) may include functionality to, for example, support fundamental virtual machine host (102) functions; schedule tasks; mediate interactivity between logical (e.g., software) and physical (e.g., hardware) virtual machine host (102) subcomponents; allocate virtual machine host (102) resources; and execute or invoke other computer programs executing on the virtual machine host (102). One of ordinary skill will appreciate that the host operating system (126) may perform other functionalities without departing from the scope of the invention.

In one embodiment of the invention, the host storage array (128) may refer to a collection of one or more physical storage devices (130A-130N) on which various forms of digital data—e.g., one or more virtual disks (not shown) (described below)—may be consolidated. Each physical storage device (130A-130N) may encompass non-transitory computer readable storage media on which data may be stored in whole or in part, and temporarily or permanently.

Further, each physical storage device (130A-130N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the host storage array (128) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the host storage array (128) may store one or more virtual disks (not shown). A virtual disk may represent a logical container, a data object, or a data structure dedicated to storing virtual machine state (also referred to as virtual machine data) and associated metadata. Further, each virtual machine (120A-120N), on the virtual machine host (102), may map to and access virtual machine data stored in one or more virtual disks. Also, each virtual disk may span across one or more physical storage devices (130A-130N) and/or media that implement, at least in part, the host storage array (128).

While FIG. 1B shows a configuration of subcomponents, other virtual machine host (102) configurations may be used without departing from the scope of the invention.

Figure 1C:
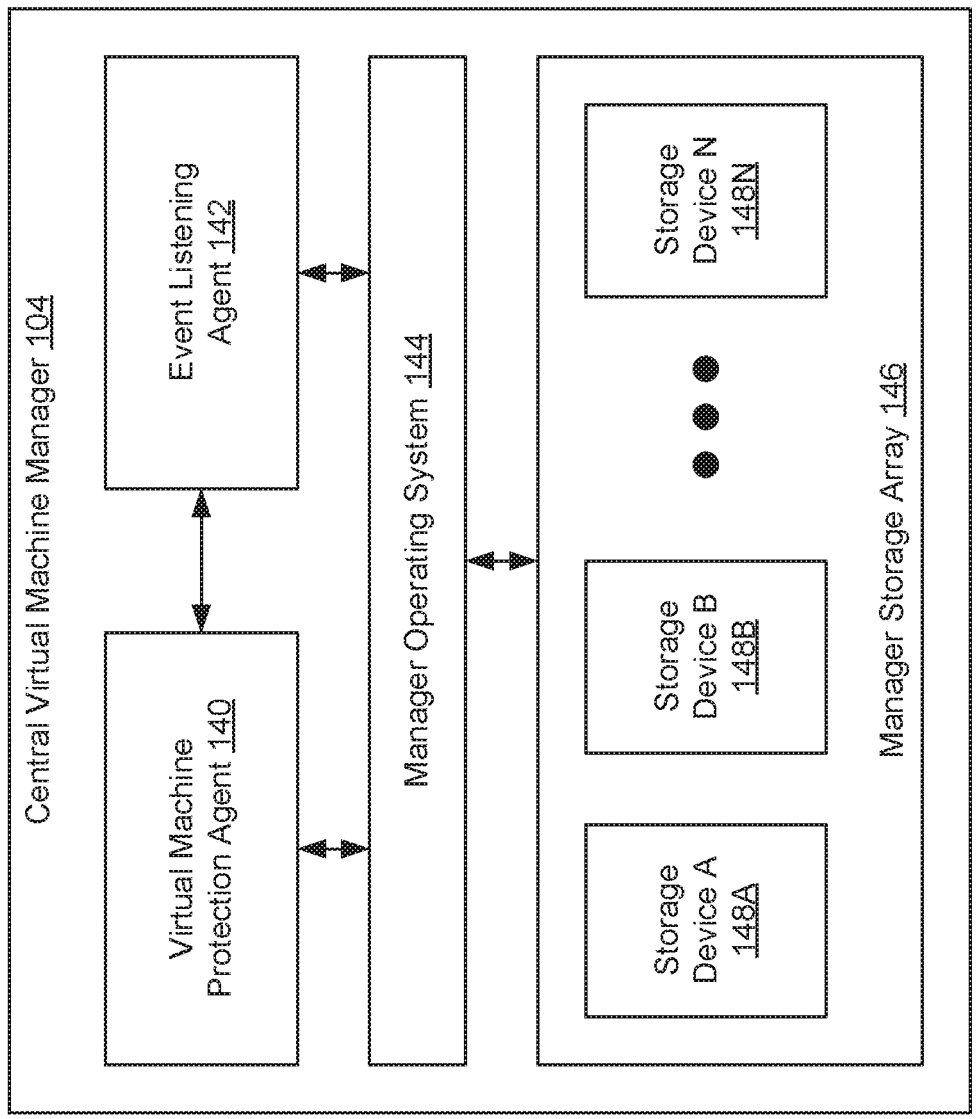
FIG. 1C shows a central virtual machine manager in accordance with one or more embodiments of the invention.

FIG. 1C shows a central virtual machine manager in accordance with one or more embodiments of the invention. The central virtual machine manager (104) may include a virtual machine protection agent (140), an event listening agent (142), a manager operating system (144), and a manager storage array (146). Each of these central virtual machine manager (104) subcomponents is described below.

In one embodiment of the invention, the virtual machine protection agent (140) may represent a computer program that executes on the underlying hardware of the central virtual machine manager (104). Specifically, the virtual machine protection agent (140) may be responsible for managing aspects pertaining to virtual machine state protection, including, but not limited to, implementing, at least in part, virtual machine state backup operations, virtual machine state replication or cloning operations, and/or virtual machine state recovery operations. The virtual machine protection agent (140) may include functionality to interact or communicate with a counterpart agent on any virtual machine host (see e.g., FIGS. 1A and 1B) in order to ensure virtual machine state protection. One of ordinary skill will appreciate that the virtual machine protection agent (140) may perform other functionalities without departing from the scope of the invention.

In one embodiment of the invention, the event listening agent (142) may represent a computer program that executes on the underlying hardware of the central virtual machine manager (104). Specifically, the event listening agent (142) may be configured to: generate protection events (described below) (see e.g., FIG. 2); detect these protection events when triggered by the onset of specified events (e.g., deletion or shutdown) impacting a protected virtual machine— i.e., a virtual machine executing on a virtual machine host, which may have been placed on a protection watch-list; maintain the aforementioned protection watch-list; and instigate virtual machine state protection procedures (see e.g., FIG. 3) in response to detecting triggered protection events.

One of ordinary skill will appreciate that the event listening agent (142) may perform other functionalities without departing from the scope of the invention.

In one embodiment of the invention, the manager operating system (144) may refer to a computer program that executes on the underlying hardware of the central virtual machine manager (104). Specifically, the manager operating system (144) may be configured to oversee central virtual machine manager (104) operations. To that extent, the manager operating system (144) may include functionality to, for example, support fundamental central virtual machine manager (104) functions; schedule tasks; mediate interactivity between logical (e.g., software) and physical (e.g., hardware) central virtual machine manager (104) subcomponents; allocate central virtual machine manager (104) resources; and execute or invoke other computer programs executing on the central virtual machine manager (104). One of ordinary skill will appreciate that the manager operating system (144) may perform other functionalities without departing from the scope of the invention.

In one embodiment of the invention, the manager storage array (146) may refer to a collection of one or more physical storage devices (148A-148N) on which various forms of digital data—e.g., one or more virtual disk copies (not shown) (described below)—may be consolidated. Each physical storage device (148A-148N) may encompass non-transitory computer readable storage media on which data may be stored in whole or in part, and temporarily or permanently. Further, each physical storage device (148A-148N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the manager storage array (146) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the manager storage array (146) may store one or more virtual disk copies (not shown). A virtual disk copy may represent a logical container, a data object, or a data structure dedicated to storing replica virtual machine state (also referred to as replica virtual machine data) and associated replica metadata. Further, each virtual disk copy may span across one or more physical storage devices (148A-148N) and/or media that implement, at least in part, the manager storage array (146).

While FIG. 1C shows a configuration of subcomponents, other central virtual machine manager (104) configurations may be used without departing from the scope of the invention.

Figure 2:
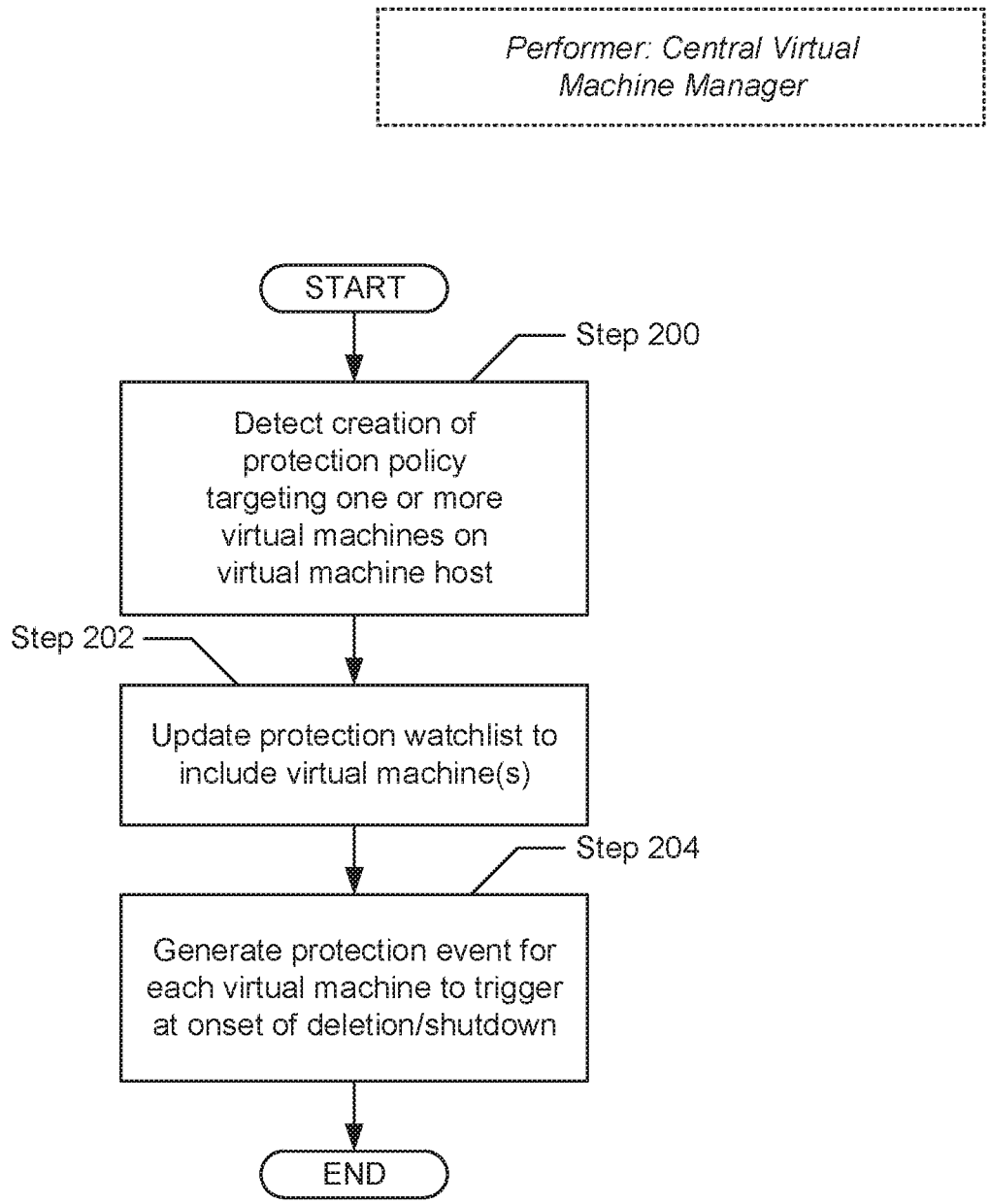
FIG. 2 shows a flowchart describing a method for generating protection events in accordance with one or more embodiments of the invention.

FIG. 2 shows a flowchart describing a method for generating protection events in accordance with one or more embodiments of the invention. The various steps outlined below may be performed by the central virtual machine manager (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, creation of a protection policy on a virtual machine host is detected. In one embodiment of the invention, the protection policy may target one or more virtual machines executing thereon, and may protect the virtual machine(s) (or more specifically, protect the associated virtual machine data and/or metadata) upon the onset of specified events—e.g., the deletion or shutdown of the virtual machine(s).

In Step 202, a protection watch-list is updated. Specifically, in one embodiment of the invention, the protection watch-list may be updated to include the virtual machine(s) (targeted by the protection policy detected in Step 200) (or more specifically, unique identifiers thereof). The protection watch-list may refer to a data object (e.g., file) or data structure (e.g., table) for tracking which virtual machines are to be protected upon the onset of a specified event.

In Step 204, a protection event is generated for each virtual machine (targeted by the protection policy detected in Step 200). In one embodiment of the invention, a protection event may refer to an alarm or notification mechanism configured to trigger upon the onset of the specified event respective to the protection event's given virtual machine.

Figure 3:
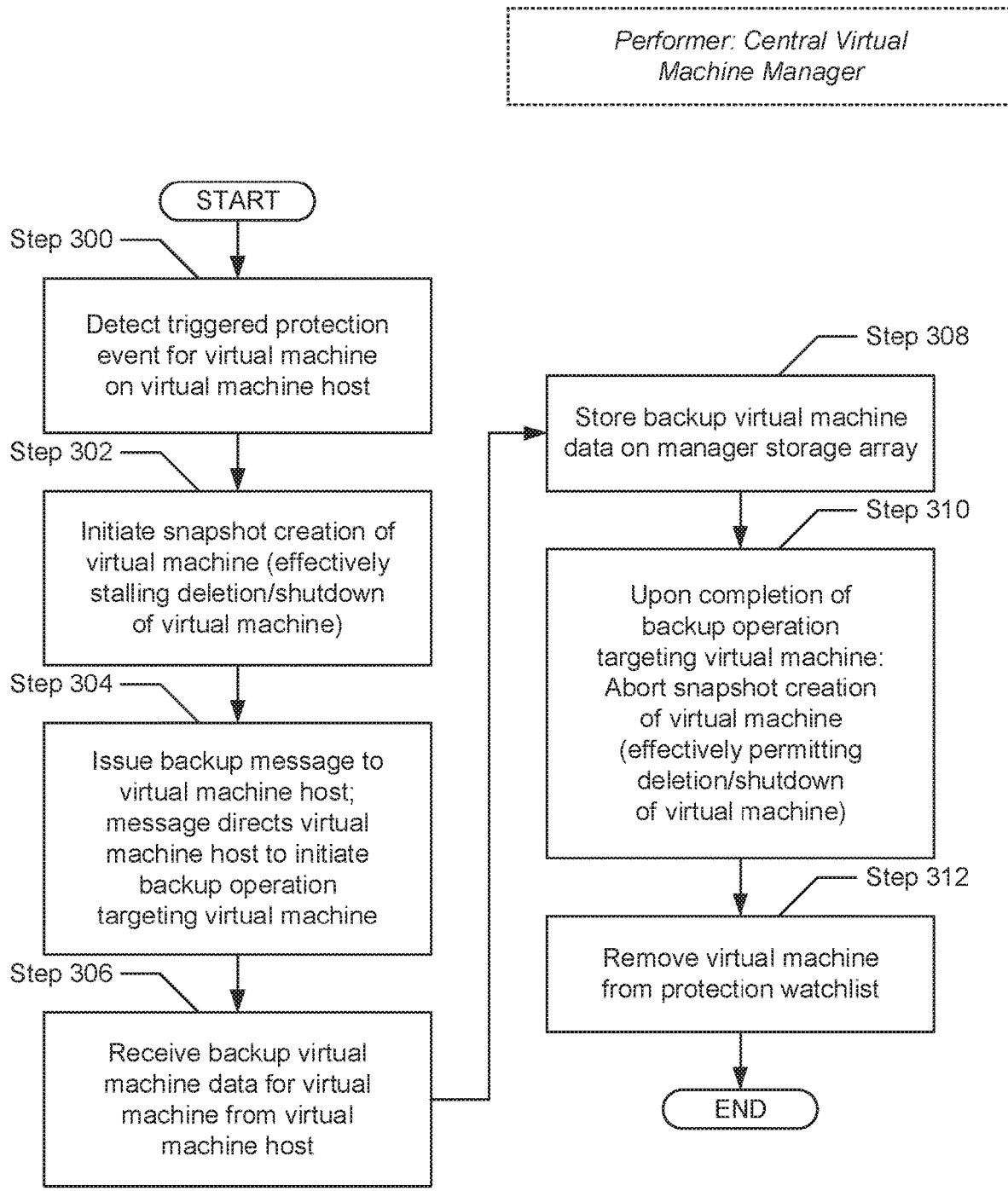
FIG. 3 shows a flowchart describing a method for virtual machine protection in accordance with one or more embodiments of the invention.

FIG. 3 shows a flowchart describing a method for virtual machine protection in accordance with one or more embodiments of the invention. The various steps outlined below may be performed by the central virtual machine manager (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a triggered protection event is detected. In one embodiment of the invention, the triggered protection event may refer to an alarm or notification mechanism that has activated upon the onset of a specified event pertinent to a given virtual machine executing on a virtual machine host. The specified event, for example, may manifest as the attempted deletion or shutdown of the given virtual machine.

In Step 302, creation of a virtual machine snapshot is initiated. In one embodiment of the invention, the virtual machine snapshot may reference replica virtual machine state, of the given virtual machine, at a given point-in-time. Further, to properly create the virtual machine snapshot, the virtual disk (described above) (see e.g., FIG. 1B) mapped to the given virtual machine must be consistent and, therefore, immutable at least for the duration through which the virtual machine snapshot is created. Accordingly, initiating the creation of the virtual machine snapshot may place a lock on the virtual disk, thereby stalling or preventing any activities—e.g., insertion of new data and/or metadata, modification of existing data and/or metadata, deletion of any subset or all data and/or metadata, etc.—that could effect any granularity of change thereof.

In Step 304, while creation of the virtual machine snapshot (in Step 302) is initiated, a backup message is issued to the virtual machine host. In one embodiment of the invention, the backup message may direct or advise the virtual machine host to initiate a backup operation targeting the given virtual machine (with which the triggered protection event detected in Step 300 is associated).

In Step 306, in response to issuing the backup message, backup (or replica) virtual machine data and/or metadata is received. In one embodiment of the invention, the backup virtual machine data and/or metadata may represent a copy of the most up-to-date virtual machine state of the given virtual machine. In Step 308, as the backup virtual machine data and/or metadata is received, the backup virtual machine data and/or metadata is subsequently stored on the manager storage array (described above) (see e.g., FIG. 1C).

In Step 310, upon completion of the backup operation (directed or advised to be initiated in Step 304), which had targeted the given virtual machine, creation of the virtual machine snapshot (initiated in Step 302) is aborted. Effectively, in one embodiment of the invention, abortion of the virtual machine snapshot creation process may release the lock imposed on the virtual disk, mapped to the given virtual machine, at the onset of the virtual machine snapshot creation process. Further, following the release of the aforementioned lock, the specified event—e.g., deletion or shutdown of the given virtual machine—which had triggered the protection event (detected in Step 300) may be permitted to proceed.

In Step 312, the given virtual machine is removed from a protection watch-list. In one embodiment of the invention, the protection watch-list may refer to a data object (e.g., file) or data structure (e.g., table) for tracking which virtual machines are to be protected upon the onset of a specified event. Accordingly, upon protecting the virtual machine state at the onset of the specified event, the given virtual machine may be removed from protection.

Figure 4:
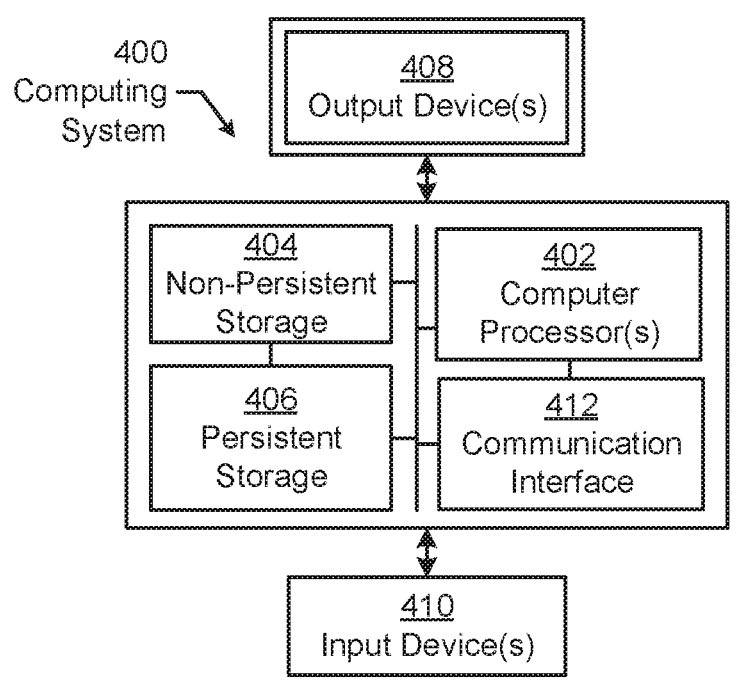
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (6412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for virtual machine protection, comprising:
   detecting a triggered protection event for a virtual machine residing on a virtual machine host,
      wherein the triggered protection event comprises an alarm activated at an onset of a specified event impacting the virtual machine,
      wherein the specified event comprises one selected from a group consisting of an attempted deletion, and an attempted shutdown, of the virtual machine,
      wherein a protection watch-list comprises an identifier of the virtual machine,
      wherein the protection watch-list is a data structure for tracking a plurality of virtual machines to be protected upon the onset of the specified event;
   in response to detecting the triggered protection event:
      initiating creation of a virtual machine snapshot for the virtual machine,
         wherein the virtual machine snapshot specifies a replica virtual machine state of the virtual machine,
         wherein initiating the creation of the virtual machine snapshot places a lock on a virtual disk (VD) mapped to the virtual machine to make the VD immutable at least for a duration through which the virtual machine snapshot is created,
         wherein making the VD immutable comprises preventing at least an insertion of newer data to the VD, a modification of existing data on the VD, and a deletion of the existing data from the VD;
      while the virtual machine snapshot is being created, issuing, to the virtual machine host, a backup message directed to performing a backup operation targeting the virtual machine;
      aborting, upon completion of the backup operation, the creation of the virtual machine snapshot, wherein aborting the creation of the virtual machine snapshot releases the lock on the VD mapped to the virtual machine; and
      after aborting the creation of the virtual machine snapshot, removing the virtual machine from the protection watch-list.

2. The method of claim 1, wherein the VD stores a virtual machine state for the virtual machine.

3. The method of claim 1, further comprising:
   prior to the completion of the backup operation and in response to issuing the backup message to the virtual machine host:
      receiving, from the virtual machine host, backup virtual machine data pertinent to the virtual machine; and
      storing the backup virtual machine data in persistent storage.

4. The method of claim 1, further comprising:
   prior to detecting the triggered protection event:
      detecting, on the virtual machine host, creation of a protection policy targeting the virtual machine;
      in response to detecting the creation of the protection policy:
         updating the protection watch-list to include the virtual machine; and
         generating a protection event for the virtual machine, wherein the protection event becomes the triggered protection event upon activating at an onset of a specified event impacting the virtual machine.

5. The method of claim 1, wherein initiating the creation of the virtual machine snapshot stalls the specified event impacting the virtual machine from proceeding, wherein aborting the creation of the virtual machine snapshot permits the specified event to proceed.

6. The method of claim 5, wherein initiating the creation of the virtual machine snapshot further stalls the specified event until the backup operation completes.

7. A non-transitory computer readable medium (CRM) comprising computer readable program code, which when executed by a computer processor, enables the computer processor to:
   detect a triggered protection event for a virtual machine residing on a virtual machine host,
      wherein the triggered protection event comprises an alarm activated at an onset of a specified event impacting the virtual machine,
      wherein the specified event comprises one selected from a group consisting of an attempted deletion, and an attempted shutdown, of the virtual machine,
      wherein a protection watch-list comprises an identifier of the virtual machine,
      wherein the protection watch-list is a data structure for tracking a plurality of virtual machines to be protected upon the onset of the specified event;
   in response to detecting the triggered protection event:
      initiate creation of a virtual machine snapshot for the virtual machine,
         wherein the virtual machine snapshot specifies a replica virtual machine state of the virtual machine,
         wherein initiating the creation of the virtual machine snapshot places a lock on a virtual disk (VD) mapped to the virtual machine to make the VD immutable at least for a duration through which the virtual machine snapshot is created,
         wherein making the VD immutable comprises preventing at least an insertion of newer data to the VD, a modification of existing data on the VD, and a deletion of the existing data from the VD;
      while the virtual machine snapshot is being created, issue, to the virtual machine host, a backup message directed to performing a backup operation targeting the virtual machine;
      abort, upon completion of the backup operation, the creation of the virtual machine snapshot, wherein aborting the creation of the virtual machine snapshot releases the lock on the VD mapped to the virtual machine; and
      after aborting the creation of the virtual machine snapshot, remove the virtual machine from the protection watch-list.

8. The non-transitory CRM of claim 7, wherein the VD stores a virtual machine state for the virtual machine.

9. The non-transitory CRM of claim 7, comprising computer readable program code, which when executed by the computer processor, further enables the computer processor to:

prior to the completion of the backup operation and in response to issuing the backup message to the virtual machine host:
receive, from the virtual machine host, backup virtual machine data pertinent to the virtual machine; and
store the backup virtual machine data in persistent storage.

10. The non-transitory CRM of claim 7, comprising computer readable program code, which when executed by the computer processor, further enables the computer processor to:

prior to detecting the triggered protection event:
detect, on the virtual machine host, creation of a protection policy targeting the virtual machine;
in response to detecting the creation of the protection policy:
update the protection watch-list to include the virtual machine; and
generate a protection event for the virtual machine, wherein the protection event becomes the triggered protection event upon activating at an onset of a specified event impacting the virtual machine.

11. The non-transitory CRM of claim 7, wherein initiating the creation of the virtual machine snapshot stalls the specified event impacting the virtual machine from proceeding, wherein aborting the creation of the virtual machine snapshot permits the specified event to proceed.

12. The non-transitory CRM of claim 11, wherein initiating the creation of the virtual machine snapshot further stalls the specified event until the backup operation completes.

* * * * *